United States Patent
Miloslavsky et al.

(10) Patent No.: US 8,296,238 B2
(45) Date of Patent: *Oct. 23, 2012

(54) SHARED ROYALTY PLATFORM FOR CONTENT ROYALTY MANAGEMENT

(75) Inventors: Alec Miloslavsky, Hillsborough, CA (US); Cal O'Kelly, San Francisco, CA (US); Jacob Feldman, Edison, NJ (US); Michael Koifman, Redwood City, CA (US)

(73) Assignee: Equatrax, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,632

(22) Filed: Nov. 5, 2010

(65) Prior Publication Data

US 2011/0054923 A1    Mar. 3, 2011

Related U.S. Application Data

(62) Division of application No. 12/024,281, filed on Feb. 1, 2008, which is a division of application No. 11/637,935, filed on Dec. 13, 2006, now Pat. No. 7,747,474.

(60) Provisional application No. 60/749,611, filed on Dec. 13, 2005.

(51) Int. Cl.
*G06Q 30/00* (2012.01)
(52) U.S. Cl. ................ 705/52; 705/51; 705/54; 705/77
(58) Field of Classification Search .................... 705/51, 705/53, 56

See application file for complete search history.

(56) References Cited

U.S. PATENT DOCUMENTS

| | | | | |
|---|---|---|---|---|
| 5,875,431 A * | 2/1999 | Heckman et al. | ............... | 705/7 |
| 6,161,142 A * | 12/2000 | Wolfe et al. | ................ | 709/230 |
| 6,961,714 B1 * | 11/2005 | LeVine | ......................... | 705/51 |
| 7,072,867 B2 * | 7/2006 | Dutta | ............................ | 705/53 |
| 7,216,178 B2 * | 5/2007 | Juszkiewicz | .............. | 709/231 |
| 7,249,060 B2 * | 7/2007 | Ling | ............................ | 705/26 |
| 7,296,158 B2 * | 11/2007 | Staddon et al. | ............. | 713/171 |
| 7,426,563 B2 | 9/2008 | Morita et al. | | |
| 7,653,552 B2 | 1/2010 | Vaidyanathan et al. | | |

(Continued)

OTHER PUBLICATIONS

Miloslavsky et al., U.S. Office Action mailed May 2, 2008, directed to U.S. Appl. No. 11/637,935; 8 pages.
Miloslavsky et al., U.S. Office Action mailed Jan. 26, 2009, directed to U.S. Appl. No. 11/637,935; 7 pages.
Miloslavsky et al., U.S. Office Action mailed Oct. 16, 2009, directed to U.S. Appl. No. 11/637,935; 7 pages.

(Continued)

*Primary Examiner* — Evens J Augustin
(74) *Attorney, Agent, or Firm* — Morrison & Foerster LLP

(57) ABSTRACT

Systems and methods for the dynamic processing of royalties are disclosed. Sales records are processed on a transaction basis rather than in batch mode. This process also allows correction of information retroactively, rather than delaying the entire processing of the information. One embodiment includes a system comprising a message broker in communication with a plurality of clients and services, a state machine, a processor and a time manager. The message broker interacts with the processor to execute a common service based on events produced by the state machine. Another embodiment includes a method comprising providing a rate matrix, receiving a sales record from a database and calculating a royalty payment using the sales record and the rate matrix.

2 Claims, 8 Drawing Sheets

U.S. PATENT DOCUMENTS

| | | | |
|---|---|---|---|
| 2001/0040900 A1 | 11/2001 | Salmi et al. | |
| 2002/0002523 A1* | 1/2002 | Kossovsky et al. | 705/36 |
| 2002/0058521 A1 | 5/2002 | Yamada et al. | |
| 2002/0120501 A1* | 8/2002 | Bell et al. | 705/14 |
| 2002/0143565 A1* | 10/2002 | Headings et al. | 705/1 |
| 2003/0050837 A1 | 3/2003 | Kim | |
| 2003/0051130 A1 | 3/2003 | MeLampy et al. | |
| 2003/0065802 A1 | 4/2003 | Vitikainen et al. | |
| 2004/0015608 A1 | 1/2004 | Ellis et al. | |
| 2004/0030615 A1* | 2/2004 | Ling | 705/27 |
| 2004/0091116 A1* | 5/2004 | Staddon et al. | 380/277 |
| 2004/0199654 A1* | 10/2004 | Juszkiewicz | 709/231 |
| 2005/0262024 A1* | 11/2005 | Headings et al. | 705/59 |
| 2006/0173701 A1* | 8/2006 | Gurvey | 705/1 |
| 2007/0061197 A1* | 3/2007 | Ramer et al. | 705/14 |

OTHER PUBLICATIONS

Miloslavsky et al., U.S. Office Action mailed Oct. 7, 2009, directed to U.S. Appl. No. 12/024,281; 8 pages.

Miloslavsky et al., U.S. Office Action mailed Jul. 8, 2010, directed to U.S. Appl. No. 12/024,281; 7 pages.

Miloslavsky et al., U.S. Office Action mailed Dec. 2, 2010, directed to related U.S. Appl. No. 12/024,281; 6 pages.

* cited by examiner

| STATES \ EVENTS | INITIALIZE | VALIDATED (FALSE) | VALIDATED (TRUE) | TIME OUT | MODIFIED | MATCHED (FALSE) | MATCHED (TRUE) |
|---|---|---|---|---|---|---|---|
| NEW | WAITING FOR VALIDATION | X | X | X | X | X | X |
| WAITING FOR VALIDATION | X | INVALID | WAITING FOR MATCHING | X | WAITING FOR VALIDATION | X | X |
| INVALID | X | X | X | DETERIORATED | WAITING FOR VALIDATION | X | X |
| DETERIORATED | X | X | X | X | WAITING FOR VALIDATION | X | X |
| WAITING FOR MATCHING | X | X | X | X | WAITING FOR VALIDATION | UNMATCHED | WAITING FOR PROCESSING |
| UNMATCHED | X | X | X | DETERIORATED | WAITING FOR VALIDATION | X | X |
| WAITING FOR PROCESSING | X | X | X | X | WAITING FOR VALIDATION | X | X |

FIG.7

STANDARD RATES FOR ALL TERRITORIES

| | | | | | | | ROYALTY KEYS | | BASE | | RATE | | UNITS | | |
|---|---|---|---|---|---|---|---|---|---|---|---|---|---|---|---|
| CONFIG. LENGTH | CONFIG. MEDIA | PRODUCT TYPE | SALES SOURCE | AFFI- LIATE | PRICE LEVEL | BASE TYPE | BASE ADJUSTMENT | STANDARD PACKAGING DEDUCTION | SPECIAL PACKAGING DEDUCTION | RATE VALUE | RATE ADJUST- MENT | NON- FREE UNITS | STANDARD FREE UNITS | SPECIAL FREE UNITS |
| ALBUM | LP | | | | | RETAIL | | 12.5% | | LP=15% | | 100% | | |
| ALBUM | CT | | | | | RETAIL | | 20% | | 15% | | 100% | | |
| ALBUM | CD | | | | | PPD/WHOLESALE | | | | 85% OF LP (12.75%) | | 100% | | |
| SINGLE | LP | | | | | RETAIL | | 12.5% | | 12% | | 100% | | |
| SINGLE | CT | | | | | RETAIL | | 20% | | 12% | | 100% | | |
| SINGLE 12" | LP | | | | | RETAIL | | 12.5% | | 13% | | 100% | | |
| MAXI-SINGLE | CT | | | | | RETAIL | | 20% | | 13% | | 100% | | |
| EXTENDED PLAY | LP | | | | | RETAIL | | 25% | | 10.2% | | 100% | | |
| SINGLE | CD | | | | | RETAIL | | 25% | | 10.2% | | 100% | | |
| | ID | | | | | RETAIL | | | | 15% | | 100% | | |
| | CD | | | | | | | | | | 85% | | | |
| ALBUM | | | | | BUDGET | | | | | | 50% | | | |
| | ID | | | | BUDGET | | | | | | 50% | | | |
| ALBUM | | | | | MID | | | | | | 75% | | | |
| | ID | | | | MID | | | | | | 75% | | | |
| | | | DOMESTIC | | | | 130% | | | | | | | |
| ALBUM | | | FOREIGN | | | | 126% | | | | | | | |
| | | | | | | | | | | | | | | |

FIG.8

US 8,296,238 B2

SHARED ROYALTY PLATFORM FOR CONTENT ROYALTY MANAGEMENT

CROSS-REFERENCE TO RELATED APPLICATIONS

This application is a divisional of U.S. patent application Ser. No. 12/024,281 filed Feb. 1, 2008, which is a divisional of U.S. patent application Ser. No. 11/637,935 filed Dec. 13, 2006, now U.S. Pat. No. 7,747,474 which claims priority to U.S. Provisional Patent Application Ser. No. 60/749,611, filed Dec. 13, 2005, the disclosure of which is hereby incorporated by reference in its entirety.

BACKGROUND OF THE INVENTION

1. Field of the Invention

The invention relates to systems and methods to process royalties based on existing information as soon as it becomes available. Sales records are processed on a transaction basis rather than in batch mode. This process also allows correction of information retroactively, rather than delaying the entire processing of the information.

2. Description of Related Art

Royalty management for audio and video content products is a very complex area. Recent years have witnessed a tremendous growth of audio and video product publishers, with new product labels springing up and old labels being acquired. These factors alone have made the management of royalties extremely complicated, but furthermore, the volume of product transactions has increased greatly and is expected to explode with the advent of new media and delivery methods, such as product file downloads, pay-per-listen, pay-per-view, etc. As a result, current batch-type processing of royalty earning calculations is badly bottlenecked and soon will be so inadequate to handle the volume of transactions that it will be unusable. If it takes more than 24 hours to process a batch that means that the batch cannot be processed daily and thus must be processed less frequently, typically weekly. And once the run time for a batch process exceeds seven days, the batch may only be processed once a month, and the resulting data will so out of date that it is useless. In particular, royalty data that is older than one month does not allow publishers to view sales activity within the month. The resulting data has only historic value, which makes it very hard for publishers and sales forces to react to changes in acquisitions and royalty income. An additional problem is that royalty rates often depend on the volume of either transactions, dollars, or both, and therefore, the more delays in the processing of this information, the more convoluted and problematic the batch processes are. Thus, the delays will be even greater.

Thus, a need exists for a new shared royalty platform (SRP) that allows real-time processing of royalties, based on existing information as soon as it becomes available.

SUMMARY OF THE INVENTION

The invention relates to systems and methods for processing royalties based on existing information as soon as it becomes available. A distinguishing characteristic of the present invention is its movement over time from state to state, progressing from milestone to milestone, supporting dynamic royalty calculation processes.

Sales records may be processed on a transaction basis rather than in batch mode. This process may also allow correction of information retroactively, rather than delaying the entire processing of the information.

One embodiment includes a system for royalty management comprising a message broker in communication with a plurality of clients and services, at least a first state machine in communication with the message broker, at least a first processor in communication with the message broker and a time manager in communication with the message broker. The message broker interacts with the at least first processor to execute at least a first common service based on events produced by the at least first state machine.

Another embodiment includes a method for royalty management comprising providing at least a first rate matrix, receiving a sales record from a database, loading the received sales record to a processor, publishing an initialization event message based on the sales record, activating a state machine with the initialization event message, transferring the state of the record, updating the state of the record in the database, validating the sales record, publishing a validation event message, activating the state machine with the validation event message, transferring the state of the record, updating the state of the record in the database, publishing a matching event message, matching the sales record with a product sales agreement and calculating a royalty payment using the matched sales record and the at least first rate matrix. Yet another embodiment includes validating a license on a product that is the subject of the product sales agreement.

As will be realized, this invention is capable of other and different embodiments, and its details are capable of modification in various obvious respects, all without departing from this invention. Accordingly, the drawings and descriptions are to be regarded as illustrative in nature and not as restrictive.

BRIEF DESCRIPTION OF THE DRAWINGS

FIG. 7 shows an example of a State Machine.

FIG. 8 shows an example of a Rate Matrix (RM).

DETAILED DESCRIPTION OF THE INVENTION

Figure 1:
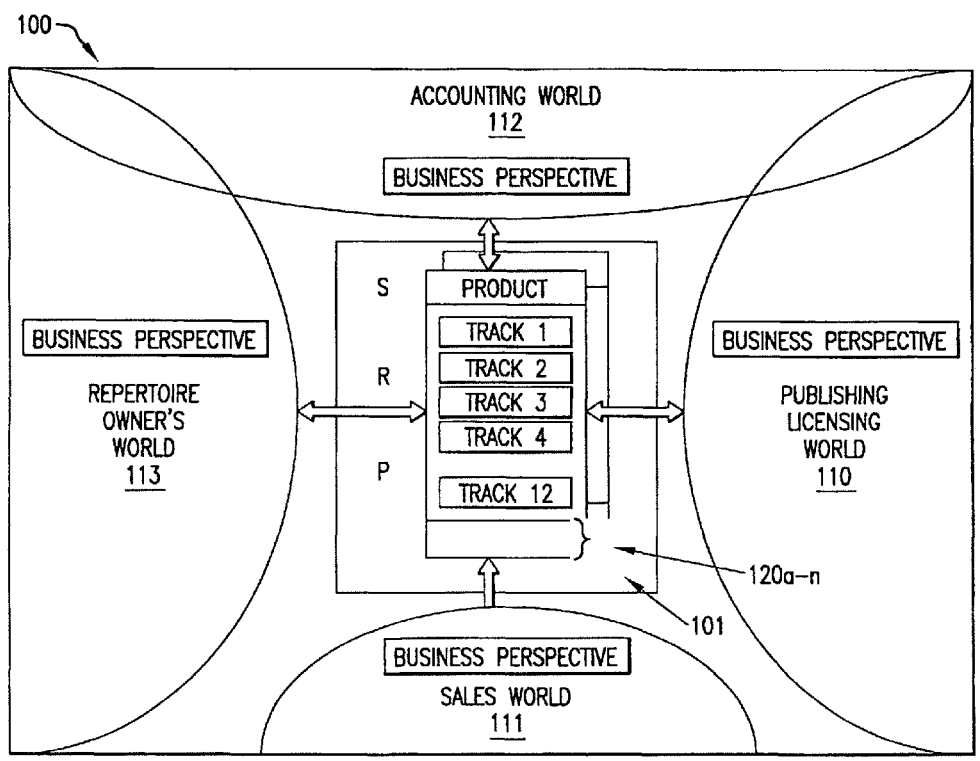
FIG. 1 shows an overview of the environment of the shared royalty platform (SRP) in one embodiment of the present invention.

FIG. 1 shows an overview of the environment 100 of the shared royalty platform (SRP) 101 in one embodiment of the present invention. FIG. 1 shows that the SRP 101 may interact with four different business perspectives that correspond to different views on the royalty generation products from four worlds, and also that each of these four worlds have their own areas of overlap and interactions. There may be a Sales World 111, which includes the business perspective from the sales and marketing side; and the Repertoire Owners' World 113, which is mostly comprised of artists and rights holders. There may also be a Publishing/Licensing World 110, which comprises the people producing and publishing the actual copyrighted works of art; and the Accounting World 112, which is a fourth business perspective, and from the SRP point of view may be an accumulator of the royalty calculation results, which are royalty amounts with explanations and a keeper of the accounting information, such as accounts, and payee, for all royalty recipients. At the center of all these worlds is the SRP 101 interacting with all four worlds.

Figure 2:
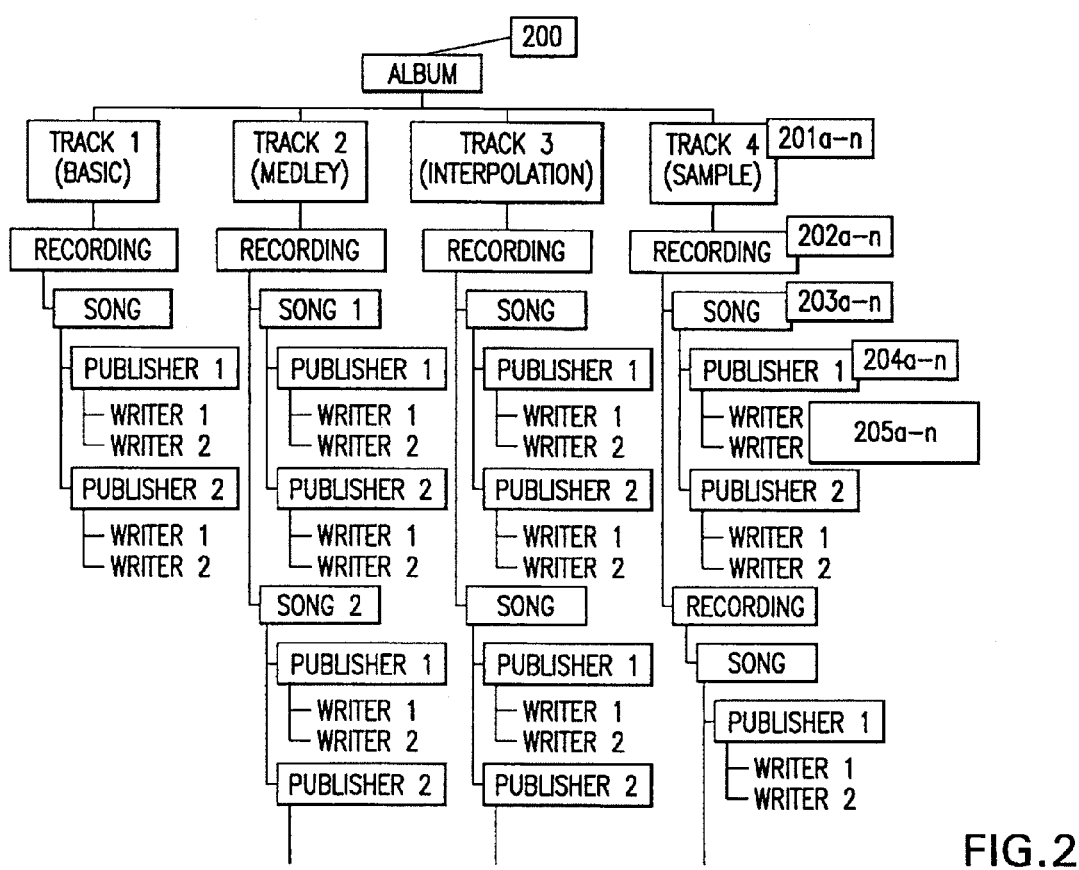
FIG. 2 shows an example of a product with related copyright obligations.

The typical product subject to processing by the SRP could be, for example, albums 120 $a$-$n$. Each album 120$a$ . . . $n$ may contain multiple tracks. Some albums may be a compilation where each track is made by a different artist and may then have one common or multiple separate publishing ownerships. FIG. 2 shows an example of a product with related copyright obligations. An album 200 may have multiple tracks 201$a$-$n$. Each track may have one or more recordings 202 $a$-$n$, and each recording may have one or more songs 203 $a$-$n$, or versions of a song, and each song may have one or more publishers 204 $a$-$n$ and one or more writers 205 $a$-$n$ who have royalty rights. In some cases details of the multiple songs within a track are shown. For example, Track 2 contains a medley of existing songs, so both Song 1 and Song 2 are shown. In other cases, such as Track 3, a track contains a new song that is a cover of an existing song, so both songs and all their respective rights holders are shown. Track 4 comprises samples of songs from various tracks from other recordings, and again, all the songs and all their respective rights holders are shown. In general, a product can be considered as a composite object that is an unlimited hierarchy of multiple embedded components. As a result, the end product may have a very complicated royalty earnings calculation model.

The SRP may be designed following the principles of Service Oriented Architecture (SOA). In this architecture, services may be oriented around a message bus that is responsible for passing messages from one service to the next. A presentation layer may be responsible for creating task-oriented GUI for different types of users (business roles) of SRP.

An application layer may represent the business logic of the system. It may be based on a set of loosely coupled services whose orchestration and execution may be driven by a Finite State Machine-based business process model (BPM) engine. The BPM engine and the services may communicate with each other through a message broker using a publish/subscribe mechanism. In one embodiment, the message broker may be based on the Java Message Service (JMS) specification. Types of business logic in the SRP may include Declarative, which may be defined either as a Finite State Machine for major business entities that implement BPM engine or business rules-based, as implemented for Royalty Calculation Services; Procedural, which may be services that have straightforward logic that is not subject to change by business users and may be implemented by Java classes; and Workflow, which may control distribution and management of analysts' tasks and approval processes, as well as time management functions.

A data layer may provide the storage of information within the SRP. In one embodiment, operational data may be stored in databases containing data for royalty processing and reporting data may be stored in a different database for performance reasons. In one embodiment, the databases may use ORACLE PL/SQL technology. In one embodiment, data stored in files may be stored in XML format and SRP interfaces may use XML documents to represent data for transfer.

Instead of making the processors and other participants of the business processes aware of exactly which events to which they are subscribed and which events they publish, one embodiment of the invention moves this knowledge to special lightweight publishers/subscribers. Different combinations of these publisher/subscribers can specify a highly efficient batch processing. Whenever necessary, the clients, processors and state machines can play the roles of being their own publisher/subscribers.

Figure 3:
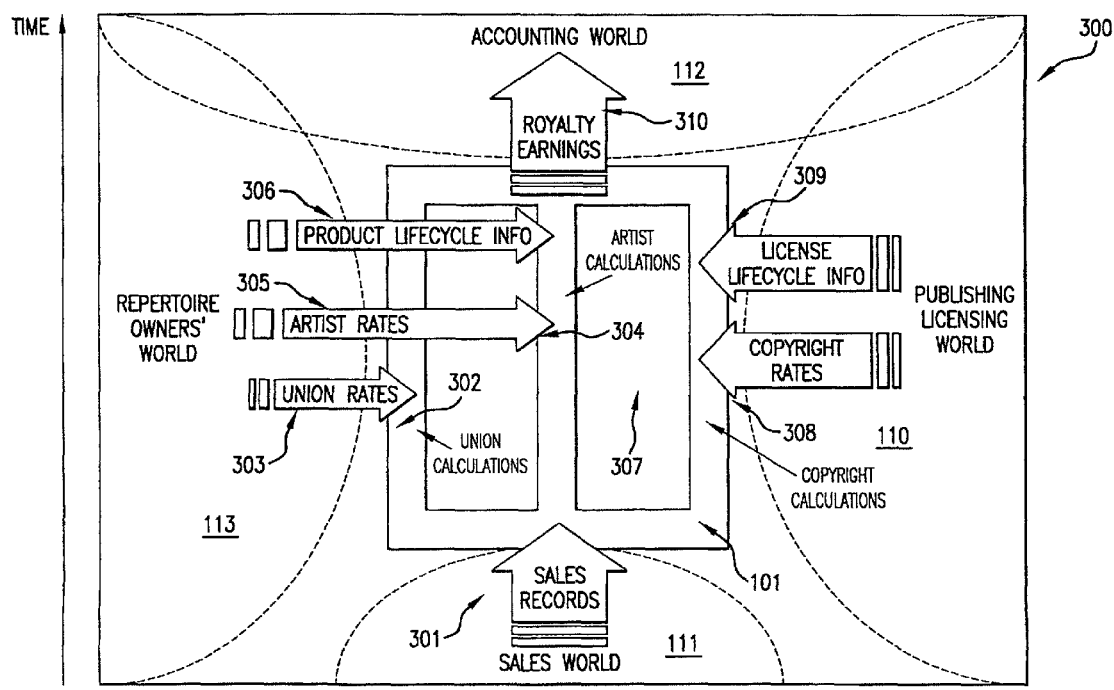
FIG. 3 shows an overview of the royalty calculation processes of the SRP.

Royalty calculations are the core of the SRP 101. Most SRP business processes may be built around royalty calculation services, feeding them with sales data and royalty calculation rates from the contracts for all related royalty recipients. Many intermediate events could happen before SRP decides that royalty calculation results are accurate and can be passed to the accounting system. FIG. 3 shows an overview of the royalty calculation processes 300 of the SRP 101. In this embodiment, the flow Sales Information 301 triggers a flow of calculations in three paths, with data coming from the Repertoire Owners World 113 and the Publishing/Licensing World 110. The first data path is Union Calculations 302, drawn from Union Rates 303. The second path is Artist Calculations 304, drawn from Artist Rates 305 and Product Lifecycle Information 306. The third path is Copyright Calculations 307, drawn from Copyright Rates 308 and License Lifecycle Information 309. The flow of data from these three paths combines into a stream of information that may be used to accumulate Royalty Earnings 310 in Accounting World 112. The fact that not all information necessary for royalty calculations comes into the system at the same time adds an additional complexity and may force the SRP to make intermediate decisions, wait for information to become available, and then make recalculations.

Figure 4:
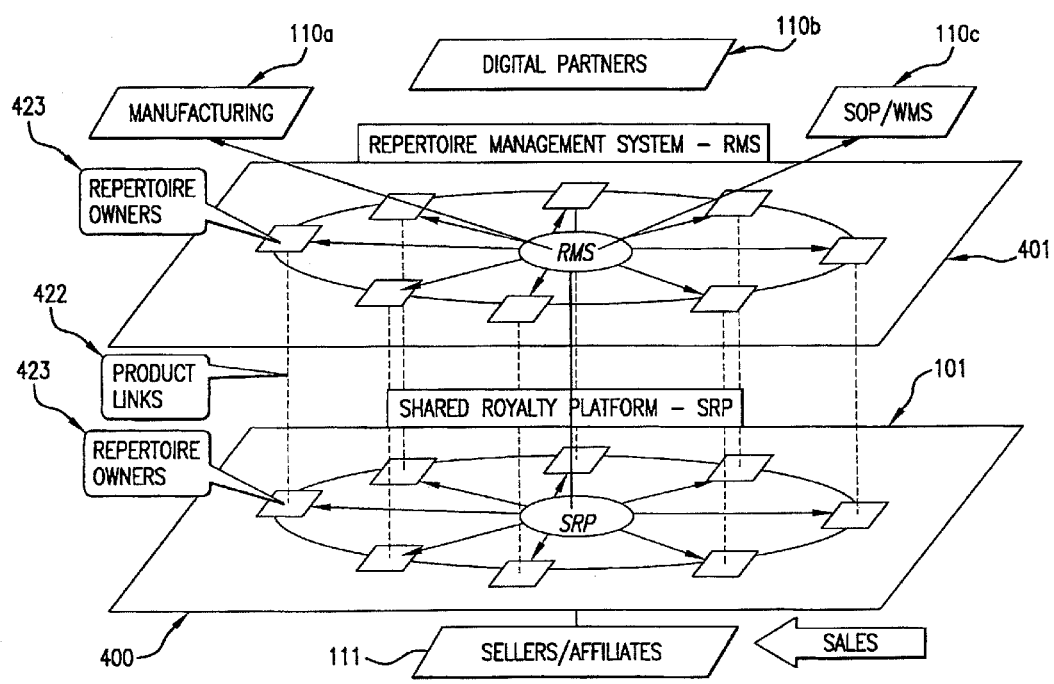
FIG. 4 shows a top-level view of the interlinking of the SRP with the Repertoire Management System (RMS).

The SRP 101 lives in a complex world communicating with other systems. In particular, it may receive all products and product updates from a Repertoire Management System (RMS) 401. FIG. 4 shows one embodiment of a top-level view 400 of the interlinking of the SRP with the RMS, from which it may receive all products and product updates. The RMS may contain data about who owns rights to and who publishes each product. The RMS may interact with different aspects of the Publishing World 110, including Manufacturing 110$a$, Digital Partners 110$b$, and SOP/WMS 110$c$ (SOP is an abbreviation for Sales Order Processing and WMS is an abbreviation for Warehouse Management System). The Repertoire Owners 423 may have stakes in the both the RMS and the SRP, as shown by the dotted line of Product Links 422 connecting those entities.

Figure 5:
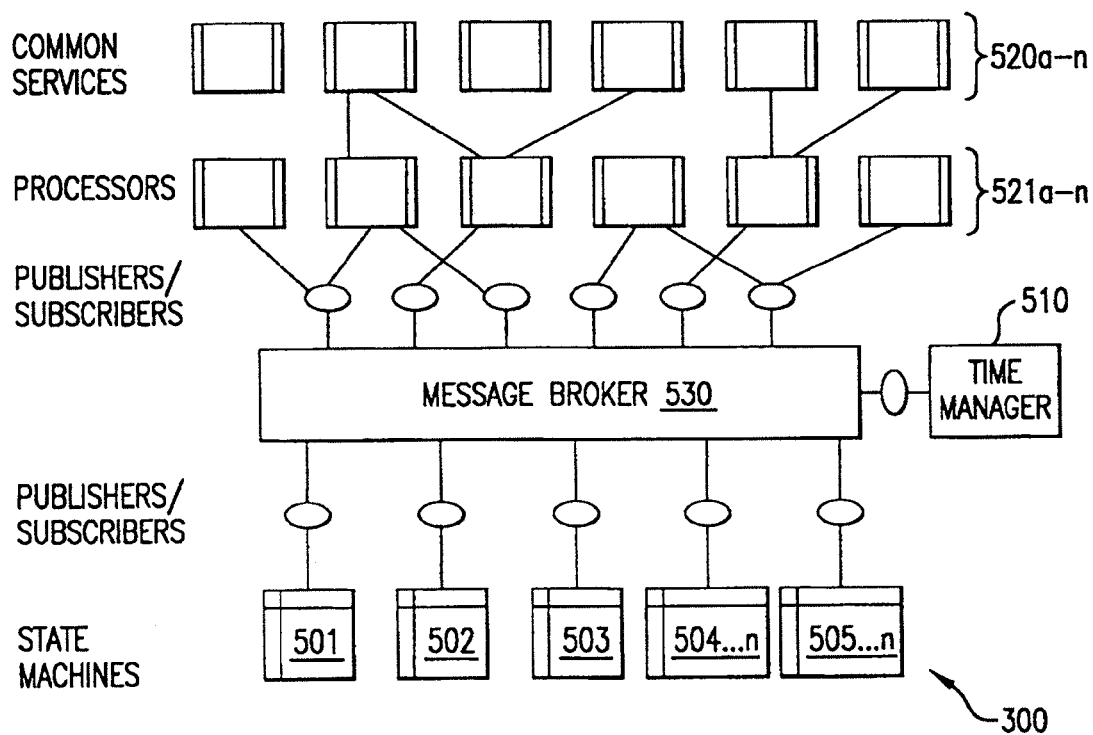
FIG. 5 shows a generic architecture of one embodiment that allows SRP to replace batch royalty calculation processes with a Royalty Calculation Process.

FIG. 5 presents a generic architecture of one embodiment that allows SRP to replace batch royalty calculation processes with one process, a Royalty Calculation Process that may be always active and processes sales records on a transaction basis rather than in batch mode. The Royalty Calculation Process may react to all system events using an event managing mechanism 500. The Message Broker 530 may provide a generic event management mechanism with publish/subscribe facilities. Events may travel between clients (publishers/subscribers) in the form of messages. This allows different SRP clients, such as processors and state machines, to produce and consume system events, such as "new sales records came" or "a rate matrix has been changed." Message Broker 530 may interact with Processors 521$a$ through 521$n$ to execute Common Services, such as a royalty calculation service, 520$a$ through 520$n$ based on events produced by State Machines 501. The messages associated with events usually contain the event type, an object ID on which the event happened, and other event-specific information. SRP services, called Processors, may communicate using a publish/subscribe mechanism. They may be invoked when they receive messages to which they are subscribed that are emitted by the State Machines or by other Processors. They can also publish messages that can cause state transition or invocation of other Processors that subscribe to these mechanisms.

State Machines 501 through 505 *a-n* may be defined for all types (not instances) of business objects whose life cycles are maintained by SRP. They may specify process- or company-specific reactions to the state changes of the major SRP entities. SRP may maintain separate state machines for sales records, products, contracts, licenses, sub-ledgers, and other major entity types. State Machines may define and control how these objects change their states when certain events occur. State Machines may subscribe to receive all their events, and they may publish all their state transitions as events as well. A state machine may be envisioned as a table with a list of possible states as rows and a list of possible events as columns. Each cell may define how the proper event changes the proper state. A state machine may subscribe to receive all its events. At the same time, it may publish all state transitions that actually happened as other events. An example of a state machine is presented in FIG. 7. The state machines may govern which pre- and post-processing logic is executed on every transition and what messages are emitted.

Time Manager 510 may be a special processor that is responsible for handling temporal events. Time Manager 510 may publish different temporal events at pre-defined time. Many SRP royalty calculation and reporting processes may be initiated on certain dates via the Time Manager. Time manager may also be subscribed to all SRP temporal events like "Delay this record calculation for 10 days" during which some missing copyright data can be provided. Process- or company-specific time delays are defined as temporal events. Use of the Time Manager 510 may allow the system to time-stamp events and may prevent events from being lost or overlooked.

Figure 6:
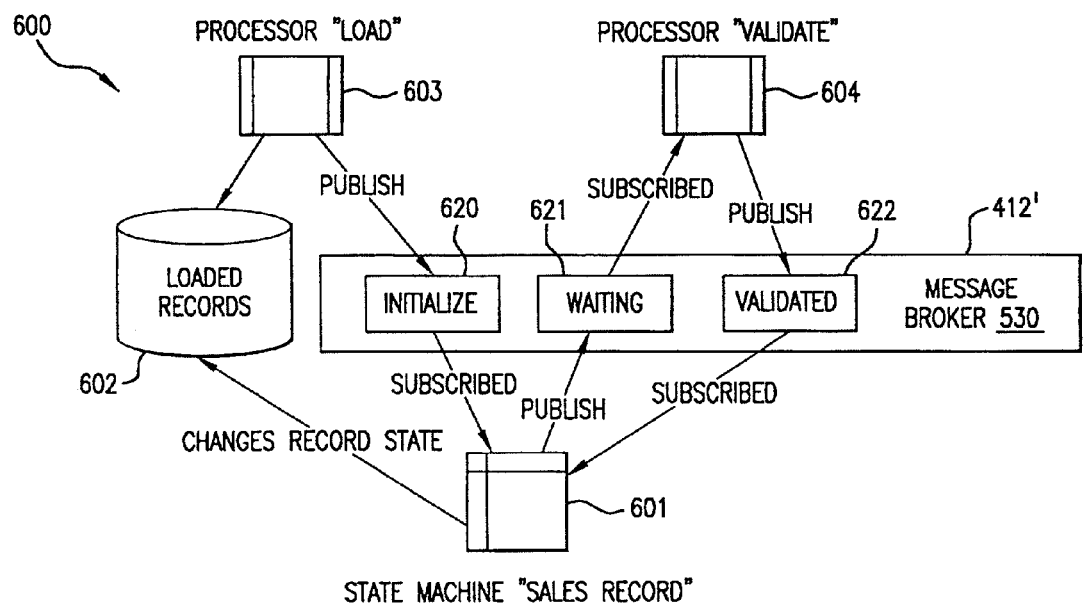
FIG. 6 is an illustration of the main SRP Royalty Calculation Process.

FIG. 6 is a snapshot of one embodiment of the main SRP Royalty Calculation Process 600 described above. In this example, an initial Processor "Load" 603 may receive the sales records from database 602 and then publishes event "Initialize" 620 in Message Broker 530. Message Broker 530 activates the State Machine "Sales Record" 601, which is subscribed to this type of event. In this example, the State Machine 601 is further defined in FIG. 7. State Machine 601 transfers the record from the state "New" to the state "Waiting for Validation," makes the proper changes in the database 602, and publishes a new event "A record is waiting for validation." Message Broker 530 activates Processor "Validate" 604 which is subscribed to this type of events. Processor "Validate" 604 validates the content of the sales record and publishes a new event "Validated" with a parameter True or False. In this example, let us assume the validation was successful. Message Broker 530 again activates the State Machine 601. State Machine 601 transfers the record from the state "Waiting for Validation" to the state "Waiting for Matching," makes the proper changes in the database 602, and publishes a new event "A record is waiting for matching." Again, another Processor, for example, one that could be called "Match Record with Rate Matrix" that is subscribed to this event will be activated, and the process will continue until there are no events to handle.

Thus, the proposed architecture 500 may eliminate the need to run different royalty calculation processes on a daily, weekly, monthly or quarterly basis. Every royalty calculation process may be implemented as a sequence of special processors that are always running or waiting to run. The processors may be activated at any time when the related objects, such as sales records, contracts, licenses or rate matrices, are changed. Therefore, the resulting sub-ledgers in the Accounting World may always have the latest calculation results. The scheduled accrual and statements run may be initiated by the proper time events, and can merely summarize the latest calculation results already saved in sub-ledgers.

Business rules that define the royalty calculation logic may be expressed using various royalty keys and factors (rates) that implement the established policies of different repertoire owners. This logic is usually defined in contracts and licenses. SRP proposes a generic way to define, maintain and execute Rate Matrices (RM) that corresponds to the different contracts and licenses. The RM may specify the following, non-exclusive list of factors:

different royalty calculation factors different combinations of royalty keys that specify conditions under which these royalty factors should be applied calculation methods and algorithms that should be used to calculate royalties.

FIG. 8 shows an example of a rate matrix. The data may be broken down into Royalty Keys, such as medium, the product type, the price level, etc. Various different royalty streams may flow from each track of each item, and each separate entry in the record may have a different royalty allocation. Additionally, percentages for the artist, the copyright owners, and all other parties with some rights to the product may be added and layered on top, and the royalty rates may change depending on volume reached per time unit, such as albums per month or per year, or on total volume, or on geographical distribution, or any of many other variables.

Different SRP business processes at different points of time may launch the appropriate royalty calculation service. A business process may feed the service with the related sales data and may receive back from the service the calculated royalty amount or rejections with explanation on how it was calculated or why input was rejected. The service may use the corresponding RMs to do the actual calculation. While the calculation logic may reside inside each RM, the major service development efforts may be directed to a unified way to specify the service's input and output, bring the corresponding RMs to the picture and then efficiently execute them. A royalty calculation service may receive as input a record with sales-related information that may include sales information corresponding to a sales record, links to the associated contract/product/licenses and links to a specific execution environment, such as repertoire owner, seller, etc. A royalty calculation service may match the sales record with a product sales agreement and process the input record and related information to calculate the royalty amount. In one embodiment, a license on a product that is the subject of a product sales agreement may be validated as part of the process of royalty calculation and management. In one embodiment, there can be two types of processing results. The first, Positive, is where the service may return the calculated amount and, if requested, explanations of how this amount was calculated. The second, Negative, is where explanations are offered as to why the royalty cannot be calculated. A business process that launched this royalty calculation service may be able to interpret the results, making the process-specific changes in the major SRP repositories.

In one embodiment, a royalty payment is the amount due for a sales transaction based on the calculation method specified for the sales transaction and the calculation variables returned from the RM. In general, a default royalty can be calculated using the following generic formula: Royalty=Adjusted Units×Adjusted Base×Adjusted Rate. In one embodiment, the RM specifies the base, rate and unit values, and the adjustments for possible situations related to different types of products and sales. In one embodiment, the rules by which the calculation methods can be applied are not hard-coded, and can be configured or redefined directly inside RMs. At the same time, the default definition of the calculation methods can be used without requiring the attention of royalty analysts. The actual selection of the methods or algorithms can be done on the level of RM templates.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A computer implementable royalty management system comprising:
   a receiving section that receives a sales record from a database;
   a publishing section that publishes an initialization event message based on the sales record;
   an activating section that activates a state machine with the initialization event message;
   an updating section that updates a state of the record from the state machine in response to the initialization event message;
   a validating section that validates the sales record;
   the publishing section configured to publish a validation event message;
   the activating section configured to activate the state machine with the validation event message;
   the updating section configured to update a state of the record from the state machine in response to the validation event message;
   the publishing section configured to publish a matching event message;
   a matching section that matches the sales record with a product sales agreement; and
   a calculating section that calculates a royalty payment using the matched sales record and a rate matrix.

2. The system of claim 1 wherein the validating section is configured to validate a license on a product that is the subject of the product sales agreement.

* * * * *